March 15, 1960 S. W. BENGTSSON 2,928,116
BEARING DEVICE FOR PIVOTED WINDOWS
Filed Feb. 3, 1956 3 Sheets-Sheet 1
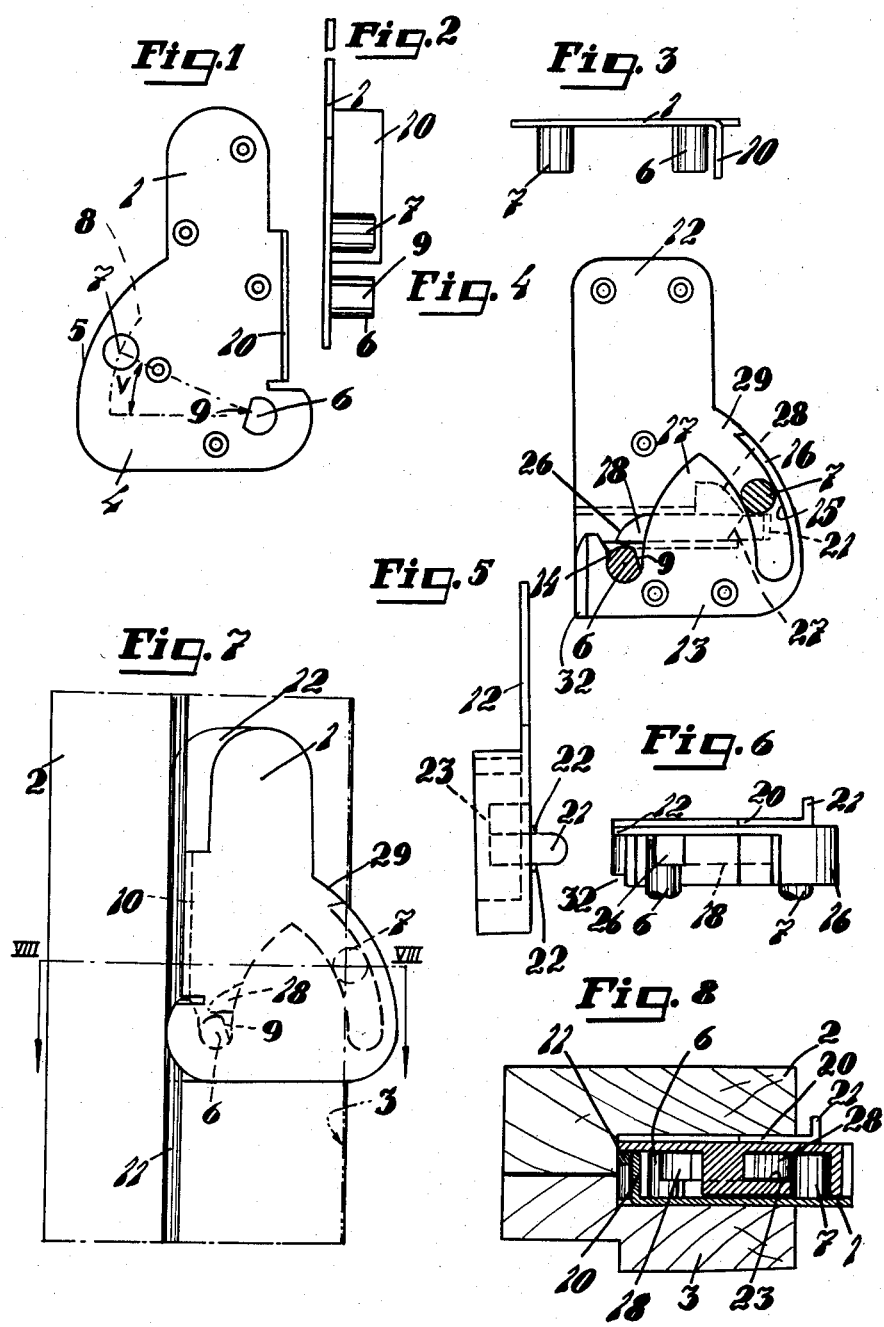
INVENTOR
SIGURD WALTER BENGTSSON
By Linton and Linton
ATTORNEYS

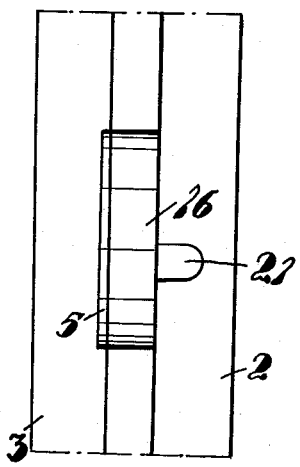
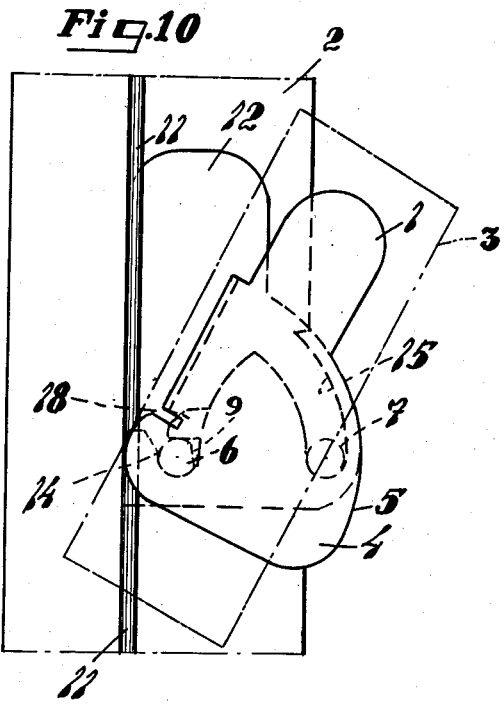
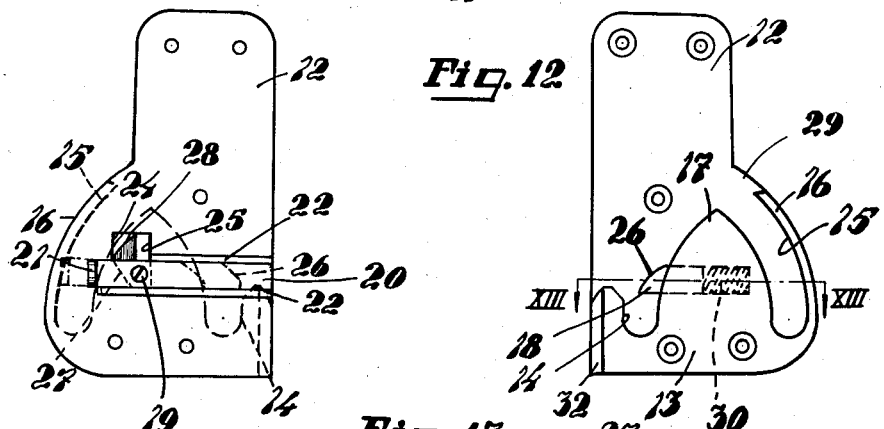
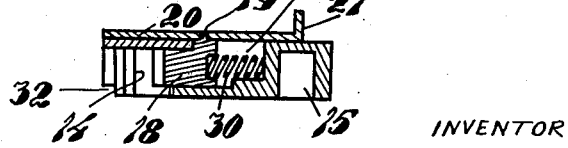
INVENTOR
SIGURD WALTER BENGTSSON

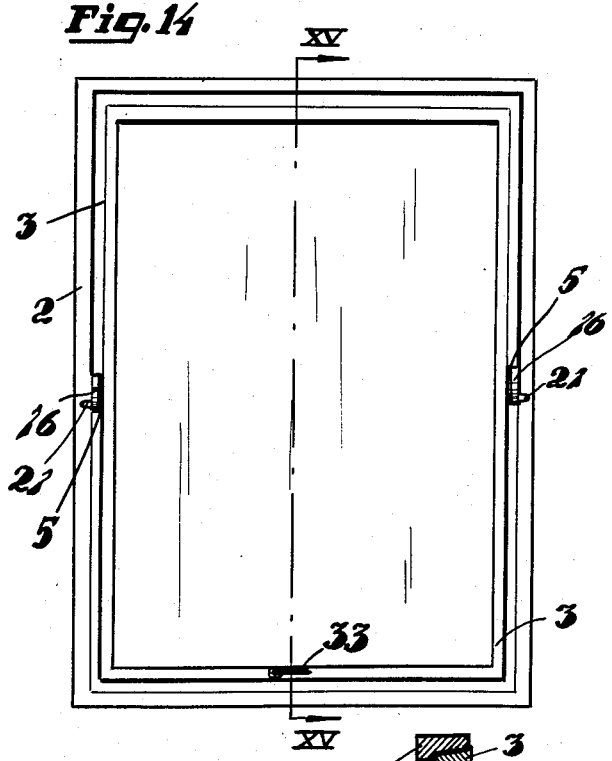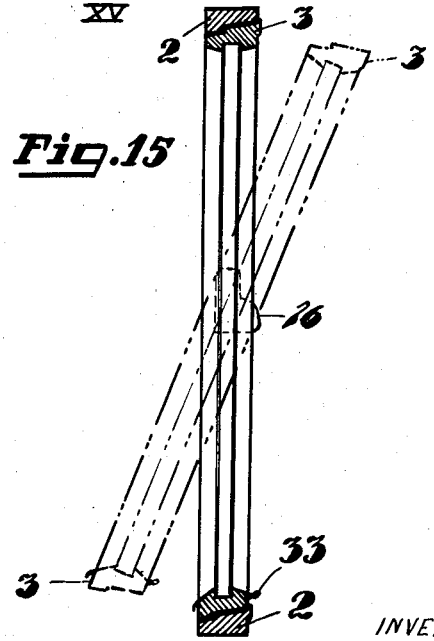

United States Patent Office 2,928,116
Patented Mar. 15, 1960

2,928,116

BEARING DEVICE FOR PIVOTED WINDOWS

Sigurd Walter Bengtsson, Langedrag, Sweden

Application February 3, 1956, Serial No. 563,385

Claims priority, application Sweden February 11, 1955

5 Claims. (Cl. 16—144)

The present invention relates to bearing devices for pivoted windows and particularly to such bearing devices as comprise a bearing element on each of two opposite substantially vertical sides of the window frame, and a second bearing element on each of two opposite substantially vertical sides of the window sash, the bearing elements of the window sash having each two horizontal pivots co-operating with corresponding bearing surfaces in the bearing elements of the window frame in such a manner that the window in closed position is carried only by the one pivot, after pivoting a certain angle to airing position is carried by both pivots and after pivoting a larger angle is carried only by the second pivot at each side of the window.

Prior devices of this kind are so constructed that they do not permit fixing of the window in airing position in a simple and efficient manner. Thus, in the use of such bearing devices disasters may occur; children may fall out through the window opening, or the window may be pivoted from closed position with the upper portion of the window moving inwards when the space is not free for such inward pivoting of the window. Often windows here referred to are large and have window-panes with an area of several square metres because of which, irrespective of personal injuries which may occur, important economical values can be spoiled. The invention has for its principal object a device by means of which disasters or misadventures of the kind mentioned are eliminated in a simple and efficient manner. Another object of the invention is to provide means for automatically stopping the pivoting of the window after it has been pivoted a relatively small predetermined angle to airing position. Other objects of the invention will be made clear by the following description with reference to the accompanying drawings illustrating two embodiments of the invention. Figs. 1 to 3 inclusive show the bearing element of the window sash in three projections perpendicular to each other, and Figs. 4 to 6 inclusive are corresponding views of the bearing element of the window frame. Fig. 7 shows the bearing device in the closed position of the window, Fig. 8 is a section on the line VIII—VIII of Fig. 7, Fig. 9 shows the bearing device viewed from the room side in the closed position of the window, Fig. 10 is a view of the device in the airing position of the window, Fig. 11 is a view of the rear side of the bearing element of the window frame, Fig. 12 is a view of the blocking device according to a second embodiment, Fig. 13 is a section on the line XIII—XIII of Fig. 12, Fig. 14 is a front view of the window on a reduced scale and Fig. 15 is a vertical section of the window on the line XV—XV of Fig. 14.

Each bearing element of the window sash 3 comprises a plate 1, one plate 1 being attached by screws or other means to each of the normally vertical side pieces of the sash. This plate is formed with a portion 4 the edge 5 of which is arcuate and when mounted on a sash extends towards the room containing the same. To the wider portion 4 of the plate 1, there are attached two substantially horizontal pins or pivots 6 and 7 which in the closed position of the window are positioned at different heights. In the closed position of the window a horizontal plane through the axis of the one pivot 6 forms a predetermined angle v to an inclined plane with which the axes of the two pivots coincide. This angle determines the opening angle of the window in its airing position and may be, for example, 20 to 25 degrees. The pivot 6 may be flattened at one side as shown at 9 to permit passage of pivot 6 past the end of wall 16 in a manner hereinafter described. At the edge opposite to the edge 5 the plate 1 is provided with an outwardly bent edge portion 10 extending vertically in the closed position of the window. The draught preventer or weather strip 11 attached to the window frame may extend uninterruptedly past the bearing elements, and the outer side of the bent edge portion 10 will bear against the draught preventer in the closed position of the window.

The bearing elements of the frame shown in detail in Figs. 4 to 6 inclusive comprise each a plate 12, each plate 12 being attached by screws or the like to a vertical side of the frame 2 adjacent the window sash. This plate is formed with a lower thickened portion 13 having two bearing grooves, viz. one bearing groove 14 adapted to receive the pivot 6 and a second bearing groove 15 adapted to receive the pivot 7. The lower ends of these grooves are rounded to conform to the curvature of the pivots and are according to the drawings positioned at the same height. In Fig. 4 the pivots 6 and 7 are shown in the positions occupied when the window is closed. The outer wall 16 of the groove 15 is arcuate in correspondence to the arcuate edge 5 of the portion 4 of the bearing element 1 on the outer face of the window sash. In a recess 23 in the wedge-shaped portion 17 located between the grooves 14 and 15 a blocking bolt 18 is slidable. A screw 19 or other means projects through a slot extending from recess 23 into the rear face of bearing element 12 and is secured to a slide 20 positioned thereon and to which slide the bolt 18 is connected by said screw or means, said slot communicating with said recess 23. The slide 20 at the end projecting into the room has a small handle 21 and is guided by guide bars 22 on the rear face of the element 12. Two opposite vertical edges 24 and 25 of the recess 23 (Fig. 11) in co-operation with a portion of the blocking bolt 18 limit the movement of said bolt in the one and the other direction respectively. In the one end position the blocking bolt 18 projects into the groove 14 above the pivot 6 and prevents the swinging of the pivot from its bearing position in said groove. In the other end position of the bolt 18 the groove 14 is free. The end of the blocking bolt adjacent to the groove 14 is formed with an oblique surface 26, and the opposite end of the bolt adjacent to the other groove 15 is formed with two oblique surfaces 27 and 28 forming an angle to each other.

The operation of the device is as follows:

In the closed position of the window, in which position the window is held by a suitable locking device (not shown) operated by a handle 33 (Figs. 14 and 15), the pivot 6 rests on the end surface of the groove 14, and the pivot 7 is located at some height above the bottom of the groove 15, as is illustrated by Figs. 4 and 7. The bolt 18 projects above the pivot 6 and prevents its upward swinging from its bearing position. If the window is to be swung to airing position shown by dot-and-dash lines in Figs. 10 and 15 it is only necessary to unlock the window by means of the handle 33 and to swing the window the predetermined angle v until the pivot 7 comes to the lower end surface of the groove 15 and thus arrives at the position shown in Fig. 10. Opening of the window to a larger angle is now prevented by the blocking bolt 18. If it is desired to open the window to a larger opening angle, for instance about 180 degrees in order to enable cleaning of the outer surface of the window pane, if the window has a single pane, or of the outer side of the outer pane, if the window has double panes, the blocking bolt 18 is retracted to the dot-and-dash position shown in Fig. 11 so that the pivot 6 is disengaged and may be swung up from its bearing position in the groove 14 while the window is pivoted on the pivot 7 resting on the end surface of the groove 15. In the continued movement the pivot 6 swings through the opening 29 above the upper edge of the arcuate portion 16 which owing to the flattened portion 9 of the pivot 6 can extend higher than otherwise possible corresponding to the reduced thickness of the flattened portion of said pivot, since the flattened side 9 thereof will face and pass close to the upper edge of the portion 16 in the movement of the pivot through the opening indicated at 29. In said cleaning position of the window, the pivot 6 is located inside the edge 16 of the bearing element 12 turned to the room. If now the window is to be pivoted back to closed position, the pivot 7, after the window has passed the airing position will be moved upwards in the groove 15 from bearing position to the position according to Figs. 4 and 7. In its upward movement the pivot 7 in co-operation with the oblique surface 27 of the blocking bolt 18 will displace the latter to blocking position above the pivot 6, so that the window will be automatically blocked when it has next time been swung to airing position. Only when the window is to be pivoted to a larger opening angle than that one corresponding to the airing position of the window, does one have to displace the blocking bolt 18 by hand.

Due to the distance between the pivots 6 and 7 the window resting on these pivots remains stable in the airing position, the mass of the window being so distributed that the window tends to assume the airing position if the same is pivoted a slight angle in the one or the other direction.

When the window has been swung 180 degrees from the closed position, the window may be disengaged from the two bearing elements 12 of the frame by lifting the window so that the pivot 7 is moved upwards in the groove 15, and as previously the pivot 6 can be moved out through the opening 29 above the arcuate portion 16. In its upward movement the pivot 7 comes in contact with the oblique surface 27 of the blocking bolt and displaces the bolt towards the groove 14. When the window again is to be journalled on the frame, the pivot 7 is first moved through the opening 29 down to the end of the groove 15. If the blocking bolt 18 before this movement of the pivot 7 projects into the groove 15, the bolt will be displaced from this position by the co-operation of the pivot 7 with the oblique surface 28 of the bolt. The window can now be pivoted about the pivot 7, and in this movement of the window the pivot 6 enters through the opening 29 and passes down into the groove 14, and the pivot 6 in co-operation with the oblique surface 26 displaces the bolt towards the groove 15. Thus, the pivot 6 in this movement will not violently strike against the bolt 18. In the continued pivoting of the window from airing position to closed position, the blocking bolt by the co-operation of the pivot 7 with the oblique surface 27 will be displaced to blocking position above the pivot 6. From the above description it will be clear thaat the bearing device with the blocking device limiting the opening angle in airing is simple and efficient in its operation and that the blocking device requires a simple manual operation only when the window is to be pivoted to larger angle.

For the draught preventer 11 a groove 32 is provided in the thicker portion 13 of the plate 12.

The invention is not restricted to the embodiment described above in detail. For example, as shown in Figs. 12 and 13, the blocking bolt 18 may be actuated by a spring 30 tending to hold the bolt in blocking position for the pivot 6. In this case, the bolt has only one oblique surface, namely the surface 26, and the pivot 7 in its movement in the groove 15 will not displace the bolt 18. The blocking of the window in the airing position will be the same as described above. When the window is to be pivoted to a larger angle than that one corresponding to the airing position, the bolt is retracted by means of the handle 21 against the action of the spring 30 to the right according to the drawings so that the exit from the groove 14 will be free. When the pivot 6 is moved back to the lower end of the groove 14 in the return movement or in the mounting of the window sash in the frame, the pivot 6 in co-operation with the oblique surface 26 will displace the bolt against the action of the spring 30 which returns the bolt to its blocking position when the pivot 6 has passed the bolt and is in its bearing position at the end of the groove 14.

The invention may also in other respects be altered within the scope of the invention. In the claims, for the sake of simplicity, it is stated that the bearing device is used for pivoted windows but the invention also includes the use of said device for pivoted shutters and similar arrangements. The blocking device may be arranged in one or both of the bearing elements of the window frame. If desired, means may be provided for locking the handle 21 of the blocking bolt, or this bolt may be movable only by means of a removable key. This may be suitable for windows in certain hospitals and schools.

What I claim is:

1. A bearing device for pivoted window sashes mounted on window frames having vertical sides, said device comprising a bearing element mounted on a vertical side of the window frame, a second bearing element mounted on a normally vertical side of the window sash, said bearing element on said window sash having two substantially horizontal pivots positioned at the median portion of said window sash, said bearing element of said window frame having bearing surfaces co-operating with said pivots so as to permit pivoting of said window sash about 180 degrees from its closed position, said bearing surfaces being spaced from each other in correspondence to the distance between said pivots to permit movement of each pivot to and from engagement with its respective bearing surface, one of said pivots in the closed position of the window sash being positioned at the same height as and supported in its corresponding bearing surface and the second of said pivots being positioned above its corresponding bearing surface whereby said window sash in closed position may be pivoted upon said first pivot to an airing position wherein said second pivot engages its corresponding bearing surface and the sash is carried by both pivots, and the sash may then be pivoted on said second pivot beyond said airing position to a greater angle of about 180 degrees from its closed position, a blocking bolt slideably mounted in one of said bearing elements and adapted to be moved to and from a blocking position, said bolt in the blocking position adapted to co-act with said first mentioned pivot to retain it in the bearing surface wherein it is supported so as to positively prevent pivoting of said window sash beyond the opening angle of said window sash in its airing position, and said bolt being slideable out of said blocking position enabling the pivoting of said window sash on said second pivot through a larger angle than that corresponding to the airing position of said window sash.

2. A bearing device as claimed in claim 1, wherein said blocking bolt has an oblique surface provided thereon, and said oblique surface is adapted to co-operate with said first mentioned pivot in such a manner that in the movement of said window sash towards its closed position from an angle which is larger than that of said window sash in its airing position, said first mentioned pivot in co-operation with said oblique surface automatically moves said blocking bolt out of said blocking position.

3. A bearing device as claimed in claim 1 wherein said blocking bolt has a pair of oblique surfaces provided thereon, and said oblique surfaces co-operating with said second pivot in such a manner that when the sash is removed and installed while at an angle greater than the angle of the airing position, said second pivot in co-operation with the one and the other, respectively, of said pair of bolt oblique surfaces automatically moves said bolt to the blocking position for said first mentioned pivot.

4. A bearing device as claimed in claim 1, wherein a spring is provided in said bearing element of said window frame and adapted to actuate said blocking bolt, and said bolt is movable from its blocking position for said first mentioned pivot against the action of said spring.

5. A bearing device for pivotally connecting window frames to window sash comprising a plate adapted to be mounted on the window frame, said plate having a V-shaped wedge member provided in one face thereof with a groove in each side of said V-shaped wedge member each at the same elevation, a manually movable slide mounted on the opposite face of said plate, said plate having a recess extending laterally of and across said V-shaped wedge member, a bolt slideably mounted in said recess and connected to said slide for manual operation of said bolt, a second plate adapted to be mounted on a portion of a window sash facing said first plate and a pair of pins carried by said second plate at different elevations and movable during opening and closing of the window sash along one side of the wedge member into and out of its respective groove while the other pin is pivotally supported in its respective groove, said bolt normally retaining one of said pins in its respective groove when said window sash is in its closed position whereby said window sash may be pivoted to an airing position wherein both pins engage their respective grooves and the sash is thereby supported in the airing position and said one pin is withdrawn from its respective groove during further pivoting of the sash beyond the airing position and the sash is supported by engagement of the second pin with its respective groove, said bolt being movable to a position blocking the groove of at least one of said pins so as to positively prevent pivoting of said window sash beyond the opening angle of said window sash in its airing position.

References Cited in the file of this patent

UNITED STATES PATENTS

| | | |
|---|---|---|
| 2,221,058 | Persson | Nov. 12, 1940 |
| 2,287,563 | Persson | June 23, 1942 |

FOREIGN PATENTS

| | | |
|---|---|---|
| 644,114 | Germany | Apr. 24, 1937 |